US006621625B1

United States Patent
Zhang et al.

(10) Patent No.: US 6,621,625 B1
(45) Date of Patent: Sep. 16, 2003

(54) OPTICAL NODE INCLUDING THREE-STAGE OPTICAL AMPLIFIER WITH AUTOMATIC GAIN AND LEVEL CONTROL

(75) Inventors: Lintao Zhang, Richardson, TX (US);
Guohua Xiao, Plano, TX (US);
Charles Mao, Plano, TX (US); Xiofan Cao, Fremont, CA (US); Jialing Yang, Fremont, CA (US); Jin Xie, Richardson, TX (US); Gang Li, Richardson, TX (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/736,855

(22) Filed: Dec. 13, 2000

(51) Int. Cl.[7] ................................. H01S 3/00
(52) U.S. Cl. ..................... 359/341.42; 359/341.41; 359/341.4; 359/341.43; 359/341.44
(58) Field of Search ............... 359/341.41, 341.42, 359/341.4, 341.43, 341.44, 332.1

(56) References Cited

U.S. PATENT DOCUMENTS

| | | | |
|---|---|---|---|
| 5,673,142 A | * 9/1997 | Fatehi et al. ............... 359/177 |
| 5,703,711 A | 12/1997 | Hamada .................... 359/177 |
| 6,028,706 A | 2/2000 | Shirasaki et al. |
| 6,055,094 A | * 4/2000 | Shima et al. ............... 359/124 |
| 6,091,541 A | * 7/2000 | Yoon ........................ 359/124 |
| 6,108,123 A | 8/2000 | Kinoshita .................. 359/161 |
| 6,172,803 B1 | * 1/2001 | Masuda et al. ............. 359/334 |
| 6,181,449 B1 | * 1/2001 | Taga et al. ................. 359/124 |
| 6,198,572 B1 | * 3/2001 | Sugaya et al. ............. 359/161 |
| 6,201,636 B1 | * 3/2001 | Noda ........................ 359/161 |
| 6,307,670 B1 | * 10/2001 | McNamara ............... 359/341.33 |
| 6,359,726 B1 | 3/2002 | Onaka et al. .............. 359/337.1 |
| 6,359,727 B1 | 3/2002 | Nakazato .................. 359/337.4 |
| 6,373,623 B1 | 4/2002 | Ohshima et al. .......... 359/341.3 |
| 6,411,429 B1 | * 6/2002 | Tomofuji et al. .......... 359/337 |
| 6,473,549 B1 | * 10/2002 | Park et al. ................. 385/123 |
| 2001/0012147 A1 | * 8/2001 | Lutz et al. ................ 359/337.2 |
| 2002/0008900 A1 | * 1/2002 | Sugaya et al. ........... 359/341.1 |

OTHER PUBLICATIONS

Sun, Y. et al. "Optical Fiber Amplifiers for WDM Optical Networks." Bell Labs Technical Journal, Jan.–Mar. 1999. pp. 187–206.*

Yadlowsky, M.J. et al. "Optical Fibers and Amplifiers for WDM Systems." Proceedings of the IEEE, 85:Nov. 11, 1997. pp. 1765–1779.*

Kinoshita, S. et al. "Large Capacity WDM Transmission Based on Wideband Erbium–Doped Fiber Amplifiers." (source unknown), Feb. 18, 2000, pp. 258–261.*

Kinoshita, S. et al. "Wideband WDM Erbium–doped Optical Fiber Amplifiers for 10 Gb/s, 32 channel SMF Transmission Systems." Fujitsu Sci. Tech. J. 35:Jul. 1, 1999, pp. 82–90.*

(List continued on next page.)

Primary Examiner—Thomas G. Black
Assistant Examiner—Stephen Cunningham
(74) Attorney, Agent, or Firm—Sawyer Law Group LLP

(57) ABSTRACT

An optical node and method for operation in an ultra long haul backbone network that provides DWDM optical transmission and wavelength networking functionalities are disclosed. The optical node is designed with capabilities for amplification, dispersion compensation, and add/drop functionalities. In one embodiment, three erbium-doped fiber amplifier (EDFA) are cascaded using low nonlinearity and low loss dispersion compensating module (DCM).

8 Claims, 4 Drawing Sheets

10

OTHER PUBLICATIONS

Becker et al. "Erbium–Doped Fiber Amplifiers: Fundamentals and Technology." Academic Press, Mar. 24, 1999, pp. 273–276.*

Nakano, Hiroyuki and Sasaki, Shinya; Dispersion–Compensator Incorporated Optical Fiber Amplifier. IEEE Photonics Technology Letters, vol. 7, No. 6, Jun. 1995.

Delavaux, J–MP and Nagel, J.A; Multi–Stage ErbiumDoped Fiber Amplifier Designs. Journal of Lightwave Technology vol. 13, No. 5, May, 1995.

Saleh, Adel A.M.; Transparent Optical Networking in Backbone Networks. Optical Fiber Conference 2000, ThD7–1, p. 62, Baltimore MD 2000.

Zhu, B.; Leng, L.; Nelson, L.E; Stulz, S; Nielsen, T.N.; Fishman, D.A. Experimental Investigation of Dispersion Maps For 40 × 10 Gb/s Transmission over 1600 km of Fiber with 100–km Spans Employing Distributed Raman Amplification. Optical Fiber Conference 2001, TUN3–1, Anaheim, CA.

* cited by examiner

OPTICAL NODE INCLUDING THREE-STAGE OPTICAL AMPLIFIER WITH AUTOMATIC GAIN AND LEVEL CONTROL

FIELD Of THE INVENTION

The present invention relates to the field of optical networks, and particularly to constructing an optical node in ultra long haul backbone networks.

DESCRIPTION OF RELATED ART

Next generation of backbone networks may interconnect optical nodes by using dense wavelength division multiplexer (DWDM), ultra long haul regeneration free transmission, optical cross connect (OXC), or optical add drop multiplexer (OADM) technologies. The drive is less for the sheer capacity boost but more for the fundamental shift in replacing the voice-centric, hard-to-scale, and slow-to-provision digital network with a data-centric, scalable, and easy-to-provision optical network.

An optical node typically performs the following basic functions. The first function is optical 2R (regenerate and reshape), including high-power and low-noise optical amplifications and dispersion management. The second function is DWDM maintenances, including gain equalization and dispersion slope control. The third function is 100% wavelength processing, including 100% wavelength manipulation such as OADM or OXC. OXC must have all optical bypassing to ensure the full transparency of the optical layer. The fourth function is wavelength monitoring, which comprises monitoring of channel wavelength, optical signal-to-noise ratio (OSNR), and all other optical intelligence. Power consumption and channel density are also significant [figure-of-merit] figures-of-merit. A shortcoming in a conventional optical node is the lack of capabilities to deal with high-power and low-noise optical amplifications, dispersion slope control, gain equalization, OADM, and OXC all the same time.

Accordingly, it is desirable to have an optical node that has the functional power, features, and performance for operation in ultra long haul networks.

SUMMARY

The invention discloses an optical node for operation in an ultra long haul backbone network that provides DWDM optical transmission and wavelength networking functionalities. The optical node is designed with capabilities for amplification, dispersion compensation, and add/drop functionalities. In one embodiment, three erbium-doped fiber amplifiers (EDFA) are cascaded using low nonlinearity and low loss dispersion compensating module (DCM).

Advantageously, the optical node in the present invention produces a more efficient power consumption and channel density. The present invention also advantageously does not rely on, but is complementary to, other ultra long haul technologies, e.g. Raman amplification, EDFA band splitting, and return-to-zero (RZ) coding.

Other structures and methods are disclosed in the detailed description below. This summary does not purport to define the invention. The invention is defined by the claims.

DETAILED DESCRIPTION

Figure 1:
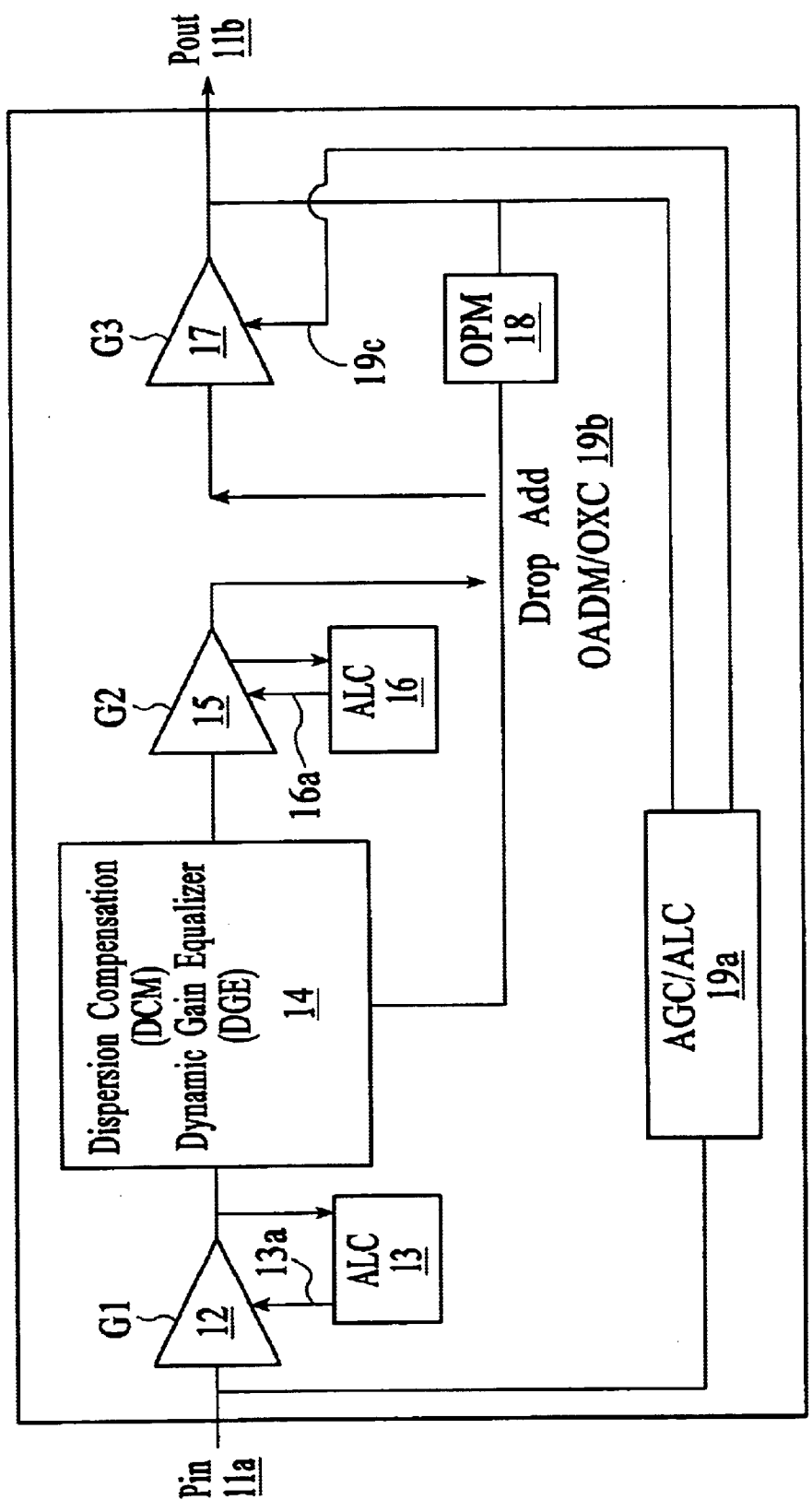
FIG. 1 is an architectural diagram illustrating an optical node configuration for ultra long haul backbone networks in accordance with the present invention.

FIG. 1 is an architectural diagram illustrating an optical node configuration 10 for ultra long haul backbone networks. The optical node 10 includes three stages of optical amplifier gain block: a G1 amplifier 12, a G2 amplifier 15, and a G3 amplifier 17. Apart from the optical amplification blocks there are control loops that are required to construct an optical node. Automatic gain control/automatic level control AGC/ALC blocks are control loops to ensure that a node is operating properly. Each G1 and G2 has its own ALC. Three loops are defined in the optical node 10. First, automatic gain control/automatic level control (AGC/ALC) 19a provision takes the input and the output levels and uses the error to control the total gain and output level of the whole optical node by adjusting the third stage G3 17 via pump control input 19c. The other two loops are local loops. ALC 13 controls the output level of the first stage G1 12 via an input 13a. In one embodiment of the invention, the first stage G1 12 is an optical fiber amplifier OFA such as an erbium-doped fiber amplifier (EDFA), and input 13a is a pump control input used to control the power output of the laser pump in the OFA. ALC 16 controls the output level of the second stage G2 15 via a pump control input 16a. In one embodiment of the invention, the second stage G2 15 is an optical fiber amplifier (OFA) such as an erbium-doped fiber amplifier (EDFA), and input 16a is a pump control input used to control the power output of the laser pump in the OFA.

An OADM/OXC has an access of 15 dB loss budget between G2 15 and G3 17. A dispersion compensation module (DCM) and a dynamic gain equalizer (DGE) 14 is an element between G1 12 and G2 15 that operates with the following features features: tunable DCM, dispersion slope compensation (DSC), dynamic gain equalization (DGE), optical performance monitoring (OPM), and low nonlinearity. Preferably, the nonlinearity and insertion loss of the passive elements (DCM, DSC, DGE, OPM, and OADM/OXC) are very low, for the optical node architecture to operate effectively. Low nonlinearity implies that very high optical output power from G1 12 can be launched into DCM portion 14, without invoking optical nonlinearities that may cause unwanted signal distortion. This, in turn, allows the first stage G1 12 to impose very high gain on an incoming optical signal via pin 11a. In tandem amplification such as this three-stage chain, high-gain first stage in G1 12 ensures that the overall noise of the chain is dominated by first stages G1 12. To characterize this in another way, once the G1 12 operates at very high gain with a low-noise figure, the overall noise figure of the G1/G2/G3 chain is similar to that of the G1 12, with little noise degradation resulting from signal propagation through the G2 15 and the G3 17. Fiber-based DCM reaches nonlinearities at about 0 dBm power per channel. One may not put a conventional DCF in between the G1 12 and the G2 15 without suffering severe degradation in the overall noise figure, because the G1 12 can operate only at moderate gain. If a DCM product is not fiber based, it can tolerate very high optical power without invoking nonlinearities. For the same reason, insertion losses of all the passive components should not be large compared to available gains from the G1 12 and the G2 15. A suitable DCM has loss <10 dB and 100% 32 channel OADM with loss for express channels 5 dB. A suitable commercial product for implementing a DCM is a PowerShaper™, made by Avanex Corporation™.

The optical node 10, with OADM/OXC access and built-in DCM/DSC/DGE/OPM, is designed to offer all the functionalities required by an ultra long haul backbone network, instead of focusing only on transport functionalities, as is the case for most conventional optical line amplifiers. The optical node 10 expands current two-stage line amplifier to three-stage, with functional characteristics of having low nonlinearity and low loss DCM. The resultant extra 15 dB access for OADM/OXC is necessary for wavelength networking, and it costs less than the 15 dB gain available from distributed Raman amplification, which has a newer deployment stage than EDFA technology, and has intrinsically poorer energy conversion efficiency than EDFA technology.

Figure 2:
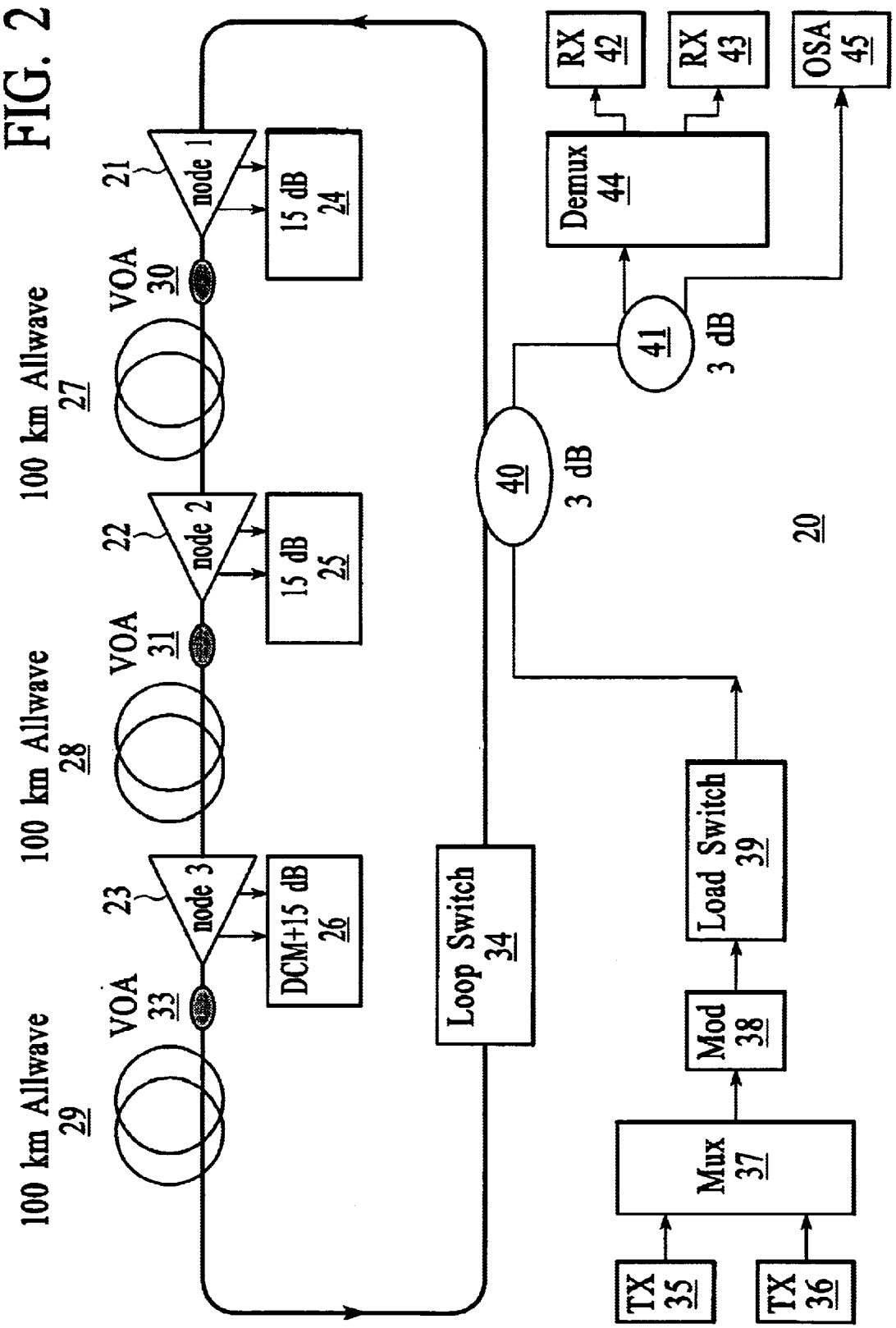
FIG. 2 is an architectural diagram illustrating a recirculating loop for verifying the integrated long haul processor in accordance with the present invention.

FIG. 2 is an architectural diagram illustrating a recirculating loop 20 for verifying the integrated long haul processor. The recirculating loop 20 has three optical nodes, a first node 21, a second node 22, and a third node 23. The third node 23 has both a DCM and +15 dB 26, while the first node 21 and the second node 22 do not have a DCM, but a 15 dB loss adjustment 24 in the first node 21 and a 15 dB adjustment 25 in the second node 22. The 15 dB represents the equivalent of inserting an add/drop multiplexer. A loss equivalent of 15 dB is inserted in placed of an actual add/drop multiplexer. A suitable DCM is a PowerShaper™, which has −5000 ps/nm dispersion at every ITU grid with 50 GHz channel spacing, made by Avanex™. Six channels spaced 50 GHz apart are combined and modulated with $2^{31}-1$ PRBS data at 2.5 Bg/s using a LiNbO$_3$ modulator. The composite DWDM signal is boosted launched into the 3-span recirculating loop. The signal is tapped out of the loop, demultiplexed and detected using eye analyzer.

The recirculating loop 20 contains three spans 27, 28, and 29 of 100 km Allwave™ fiber. The first node 21 is placed between the first span 27 and the second span 28, while the second node 22 is placed between the second span 28and the third span 29. A suitable commercial product for implementing the first node 21 and the second node 22 is PowerExpress™, a two-stage optical line amplifier, made by Avanex Corporation™. A 15 dB variable optical attenuator 30 is inserted between the first stage 21 and the second stage 22, which is equivalent the loss of 32 channel 100% OADM. A three-stage optical amplifier in the third node 23 is inserted between the third span 29 and a loop switch 34. Variable optical attenuators (VOA) 31, 32, and 33 are used to adjust launching power into a fiber for optimizing overall system performance.

Input signals are feed into a transmitter 35 and 36 for transmitting the input signals to a mux 37. In one embodiment, the mux 37 has 6 channels of inputs. A modulator 38 modules with electric signals. A load switch 39 is constructed in a reverse manner from the loop switch 34. Initially, the load switch 39 opens, and the loop switch 34 closes, so the input signal is passed into the loop. A 3 dB coupler 40 couples between the load switch 39, the recirculating loop, and a 3 dB coupler 41, which further couples to a demux 44 folowed by a receiver 42 and a receiver 43 and an optical spectrum analyzer (OSA) 45. The signal continues to pass through the load switch 39 for τ amount of time, representing the time duration for the light to travel 300 km. By the time that the first signal reaches 300 km, the loop switch 34 opens, and the load switch 39 closes, having already circulated one full loop. For example, at time 0, the load switch 39 opens, and the loop switch 34 closes. At time τ, or the amount of time for a signal to travel 300 km; the loop switch 34 opens, and the load switch 39 closes. In this illustration, a signal runs through the recirculating loop 20 ten times, or 3000 km in total distance. At the end of 3000 km, it is determined whether the signal strength still recovers.

Figure 3:
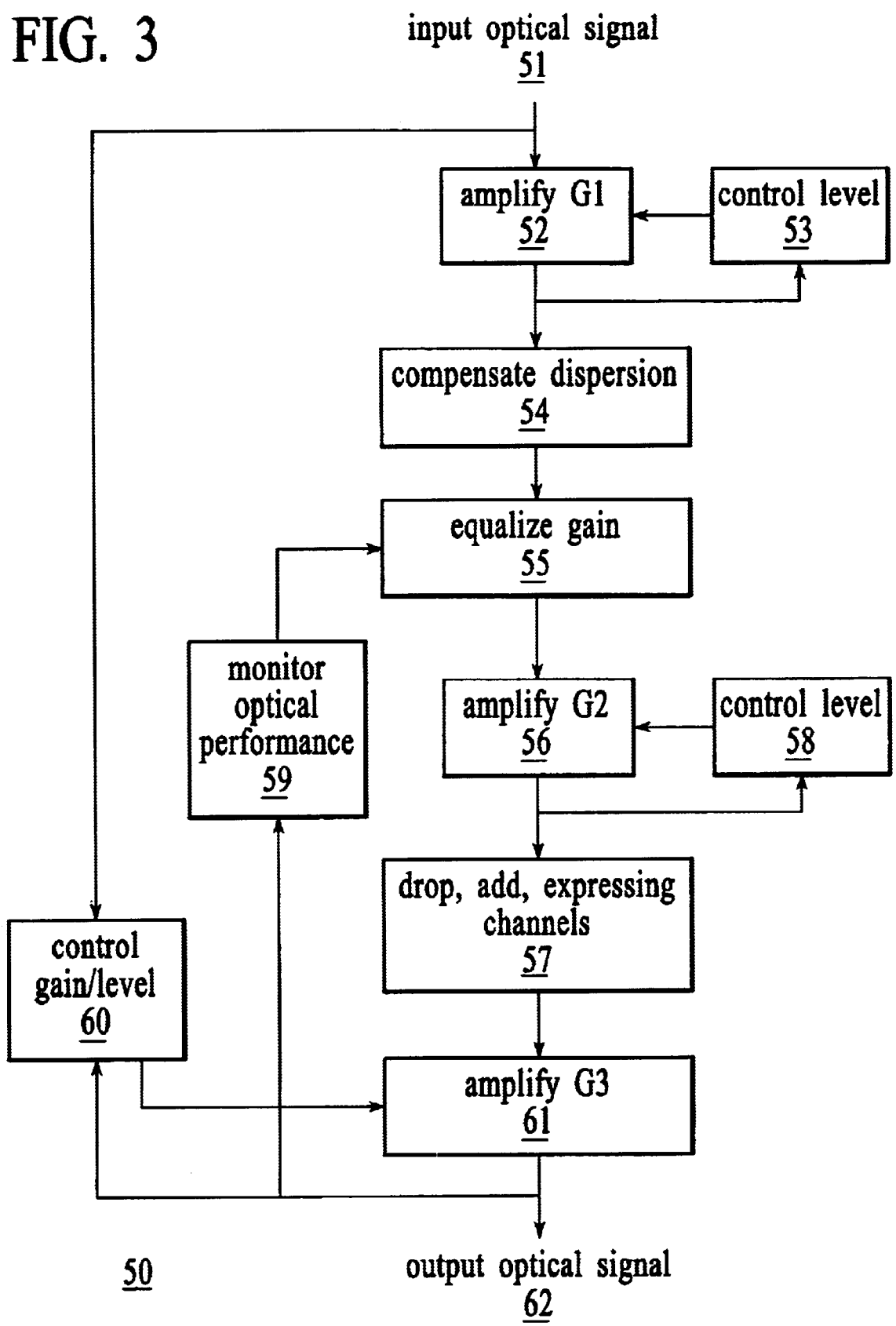
FIG. 3 is a flow diagram illustrating the process for operating an optical node in an ultra long haul network in accordance with the present invention.

FIG. 3 is a flow diagram illustrating the process 50 for operating an optical node in an ultra long haul network. The G1 amplifier 12 receives 51 an input optical signal and amplifies 52 the input optical signal with a G1 gain. The ALC 13 controls 53 the optical level of the input optical signal. The DCM/DGE 14 compensates 54 the dispersion of the optical signal from the G1 12 amplifier, and equalizes 55 the gain G1. The G2 15 amplifies 56 the optical signal received from the DCM/DGE 14 with an amplification gain of G2. The ALC 16 couples to the G2 amplifier 14 for controlling 58 the level of the optical signal generated form the G2 amplifier 15. The process 60 then drops or adds to the optical signal from the G2 amplifier 15. At a third stage, or last stage in this embodiment, the G3 amplifier 17 amplifies 59 the optical signal after add/drop operation has been performed. An optical performance monitor 18 monitors 60 the optical performance. The AGC/ALC 19 adjusts 61 control gain/level between the G3 amplifier 17 and the G1 amplifier 12. Finally, the process 60 generates 62 an amplified output optical signal.

Figure 4A:
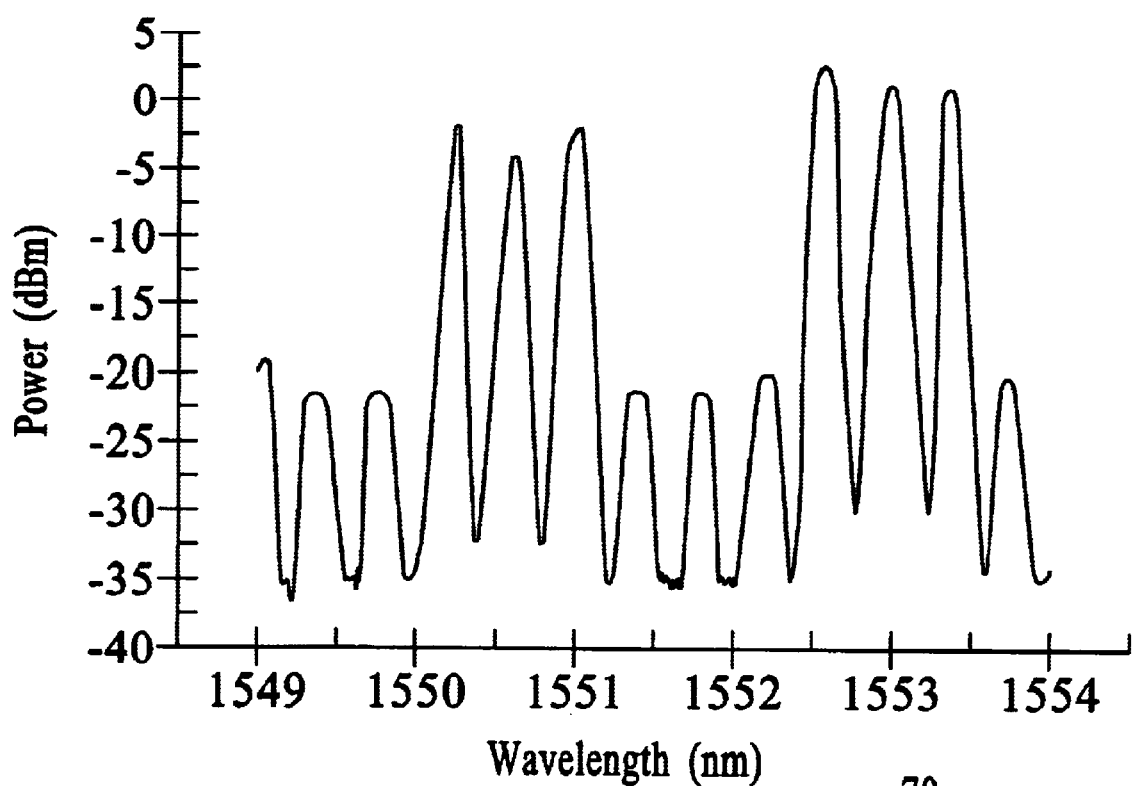
FIG. 4A is a graphical diagram illustrating a measurement of the optical signal-to-noise ratio for six channels at 3000 km in accordance with the present invention.

FIG. 4A shows the measured better than 18 dB/0.1 nm optical signal-to-noise ratio (OSNR) of all 6 channels at 3000 km. The 50 GHz spaced humps in the noise floor are due to the cyclic bandpassing characteristics of a Power-Shaper™.

Figure 4B:
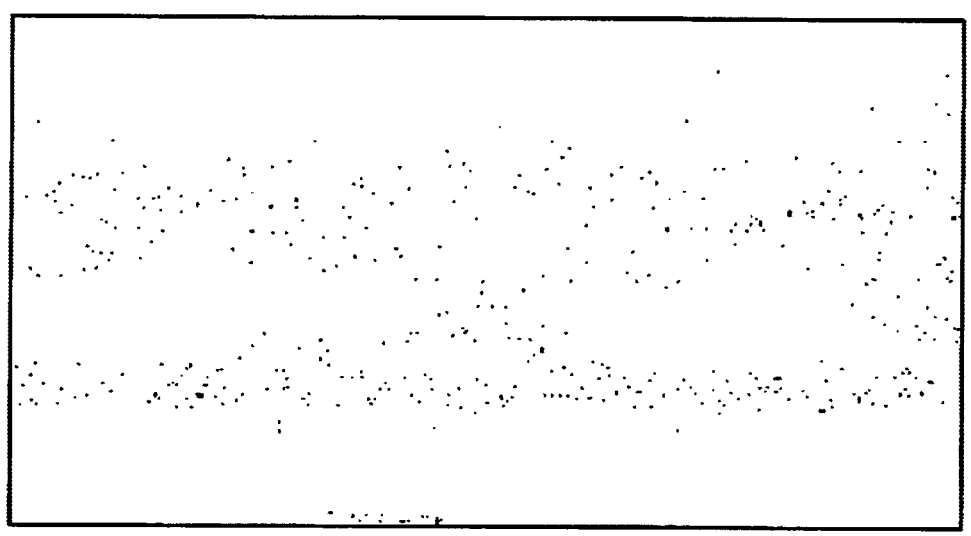
FIG. 4B is a graphical diagram illustrating an eye diagram of six channels at 3000 km in accordance with the present invention.

FIG. 4B shows the eye diagram of these channels at 3000 km. The input power into each span is about 1 dBm/channel, achieved by using fixed attenuator at the output of each PowerExpress™. An 80-channel system would need 19 dBm total output power from PowerExpress™ output EDFA, which is available form commercial DWDM EDFAs. This indicates that 80 wavelengths can be processed fully using only three commercial DWDM EDFAs.

The above embodiments are only illustrative of the principles of this invention and are not intended to limit the invention to the particular embodiments described. Although the optical node described in the present invention is in the context of an ultra long haul network, the optical node is applicable to other networks including along haul network, a metropolitan network, and an access network. Accordingly, various modifications, adaptations, and combinations of various features of the described embodiments can be practices without departing form the scope of the invention as set forth in the appended claims.

We claim:

1. An optical node, comprising:
   a first optical amplifier, having an optical input, a pump control input, and an optical output, for providing low noise and high amplification gain;
   a first automatic level control, having an input coupled to the optical output of the first optical amplifier, and an output coupled to the pump control input of the first optical amplifier, for automatic optical level control;

a second optical amplifier, having an optical input coupled to the output of first optical amplifier, a pump control input, and an optical output, for providing low noise and high amplification gain;

a second automatic level control, having an input coupled to the output of the second optical amplifier, and an output coupled to the pump control input of the second optical amplifier, for automatic optical level control of the second optical amplifier;

a third optical amplifier, having an input coupled to the output of the second optical amplifier, a pump control input, and an optical output, for providing high output power; and a third automatic gain and level control having a first input coupled to the input of the first optical amplifier, a second input coupled to the output of the third optical amplifier, and an output coupled to the pump control input of the third amplifier, for maintaining the gain level and output power level for the whole optical node.

2. The optical node of claim 1, further comprising a dispersion control module (DCM) and a dynamic gain equalizer (DGE) coupled between the optical output of the first optical amplifier and the input of the second optical amplifier.

3. The optical node of claim 2, further comprising an optical performance monitor (OPM) coupled between the optical output of the third amplifier and the dynamic gain equalizer.

4. The optical node of claim 1, further comprising an input port coupled to the input of the first optical amplifier.

5. The optical node of claim 1, further comprising an output port coupled to the optical output of the third optical amplifier.

6. The optical node of claim 5, wherein the output port is coupled to an ultra long haul backbone network.

7. The optical node of claim 5, wherein the output port is coupled to a long haul backbone network.

8. The optical node of claim 5, wherein the output port is coupled to a metro network.

* * * * *